INVENTOR.
ARTHUR H. YOUMANS

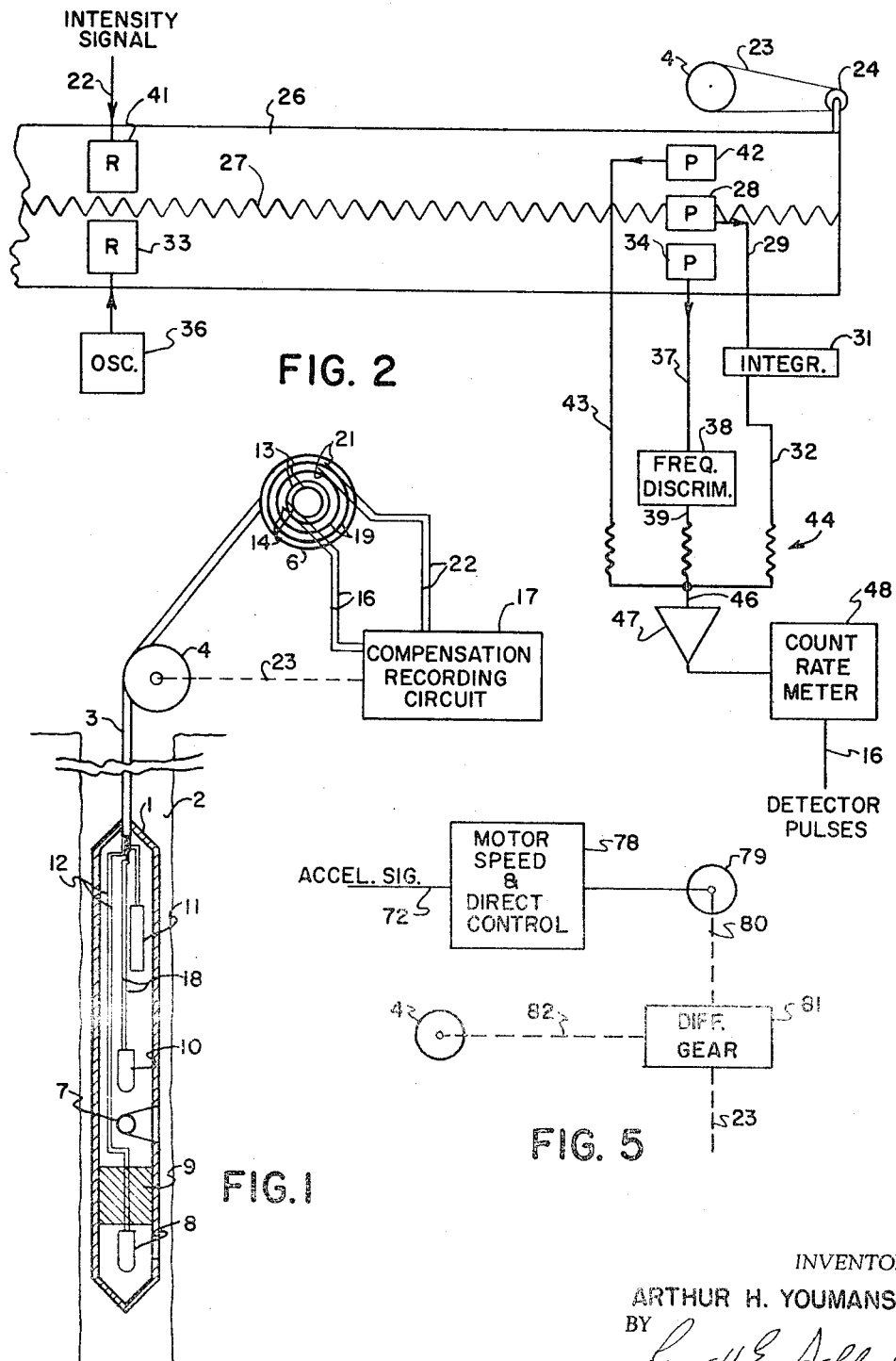

United States Patent Office 3,372,277
Patented Mar. 5, 1968

3,372,277
BOREHOLE ACTIVATION LOGGING SYSTEM COMPRISING VARYING STRATA IRRADIATION AS A FUNCTION OF THE RATE OF CHANGE OF TOOL VELOCITY
Arthur H. Youmans, Houston, Tex., assignor, by mesne assignments, to Dresser Industries, Inc., Dallas, Tex., a corporation of Delaware
Filed Dec. 24, 1963, Ser. No. 333,102
18 Claims. (Cl. 250—83.3)

The present invention relates to geophysical prospecting for valuable subsurface mineral deposits and, more particularly, to an apparatus employed in neutron logging incorporating equipment for overcoming the effects of variations in velocity of the well logging tool during a well logging operation.

Radioactivity well logging has been employed for a number of years in the field of geophysical prospecting in order to determine a number of factors concerning subsurface strata, which factors may indicate the presence or absence of oil in a given region. For instance, radioactivity well logging has been employed to identify the composition of the subsurface strata, the depth and thickness of these formations, the porosity of the formations, and the composition of fluids encountered in the various formations and their locations.

Neutron well logging is generally of two types, the first type relating to logging of prompt radiations from the formation and the second type relating to logging of induced activity in the formations. In induced activity logging, and the present invention is particularly concerned with this latter procedure, a source is provided which directs a stream of the neutrons against the formations as the tool is withdrawn from the well. A radiation detector is employed to measure the activity induced in the regions of the formations subjected to neutron bombardment. In logging a well, the well tool is lowered to the bottom of the well and then withdrawn at a generally uniform rate through the region of the well to be logged. The measurements made by the radiation detector are conveyed in the form of electric signals, over a cable, to a surface station where they are recorded on a chart which may be driven from the cable sheath reel so as to produce a record of the measurement versus depth of the well.

The radiation measured by the detector is a function of a number of parameters, such as variations in intensity of the source, variations in speed of the tool and variations of the phenoment under investigation. Normally, the variations in intensity of the source are small compared with the variations in signals produced by the phenomena under investigation and may be disregarded. When such is not the case, the source may be monitored and corrections made in the indications in accordance with observed variations.

The variation in the speed of the tool has threee distinct effects upon the eventual counting rate indicated by the detector, these effects being independent of the phenomena under investigation. A first of these effects results from variations in the duration of the irradiation of the areas of the surrounding wall, which variations effect the initial induced activity of a given area. Variations in speed of the tool also vary the time interval between irradiation and detection and, if the induced activity has a relatively short half life, the residual activity as detected by the detector is a function of this time interval. The speed of the tool during measurement of the residual induced activity in a given area by the detector also may affect the final measurement, since the observed number of counts is a function of time. However, the number of counts per unit time; i.e., the counting rate, is independent of tool speed; and, therefore, the intensity of the detected radiation may be correctly measured irrespective of logging speed, assuming that the speed of response of the detector and its associated circuitry is sufficiently fast to permit measurement while the tool is adjacent the respective formations.

Consequently, the response indicated by a detector employed in a radioactivity well logging instrument is subject to effects due to three factors which are all independent of the nature of the strata under investigation, these three factors being the instantaneous intensity of the source, the duration of the irradiation of a given area of the well bore, the time between irradiation and measurement of the area. As stated, the duration of measurement of the radioactivity of the area can also influence the results, but is not normally important.

It is an object of the present invention to provide a well logging system in which a log of radiation versus depth of the well is rendered independent of variations in source intensity and variations due to non-uniformity of the speed of the velocity of the well tool.

It is another object of the present invention to provide a well logging system in which voltages are produced indicative of the instantaneous intensity of the radiation source, the duration of irradiation of the incremental areas of the well wall, the time interval between irradiation and measurement of the areas of the wall and the duration of measurement of the radioactivity of the areas of the well wall, and in which the response produced by a radioactivity detector is varied in accordance with the algebraic sum of these voltages.

In accordance with one embodiment of the present invention, a signal proportional to the instantaneous intensity of the downhole radiation source carried in a well tool is recorded on a magnetic tape driven from a sheave at the surface station over which the logging cable passes. The source intensity signal is reproduced by a magnetic head displaced from the recording head by a distance equal to the distance the tape is driven by a movement of the instrument equal to the distance between the radioactive source and radioactivity detector in the well tool. Consequently, a signal indicating the intensity of the source when irradiating a given region of the well wall is picked up by the reproducing head at the same time that the detector on the well tool is measuring the activity of the aforesaid incremental area. The magnetic tape has a constant frequency tone prerecorded in a second channel thereof, and the tone is picked up by a second reproducing head. The output signal from the second reproducing head is applied to a circuit which produces a voltage proportional to the number of cycles of the tone which pass under the reproducing head during the time interval elapsing between irradiation and measurement. This circuit, which is hereinafter referred to as an integrator, may be a conventional rate meter having a time constant approximately equal to the average time required for the well tool to traverse a distance equal to the displacement between the radiation source and the radiation detector. In consequence, the voltage produced by the integrator is at all times proportional to the time required for the tool to move the distance equal to the distance between the source and detector.

The magnetic tape is provided with a third channel having a recording head and a reproducing head, the heads being spaced by a distance equal to the distance between the radiation source and detector. The recording head is adapted to have applied thereto a constant frequency signal which is frequency modulated upon recording, in accordance with the instantaneous velocity of the tape and, consequently, in accordance with the irradiation interval of a given area. This provides a recorded signal indicative of the tool speed as a function of the position of the detector in the borehole. This signal, upon being presented to the reproducing head, is continuously compared with the aforementioned second channel signal. Since the second channel provides a signal having a frequency proportional to the speed of the tool at the instant of detection, the ratio of the two frequencies provides a signal dependent only on the speed of the tool at the instant of irradiation, and thereby indicative of the irradiation interval. By means of an appropriate frequency discriminator, a voltage may be derived which is proportional to the aforesaid speed. If now, the voltages proportional to intensity of the source, to the elapsed time between irradiation and detection, and to the period of irradiation are combined in proper proportion, there is produced an error voltage which is a function of all three of the undesirable variable parameters of the system. This voltage may now be employed to correct the counting rate signal generated by the radiation detector, so that the corrected signal represents variations attributable only to variations in the phenomena under investigation.

A more precise method of obtaining a voltage, exactly proportional to the elapsed time between irradiation and measurement, is to employ the above magnetic tape, having a constant frequency tone, and to integrate the number of cycles between the recording and the reproducing head by means of a "square memory" circuit. By a "square memory" circuit is meant an integrating system which weighs all pulses equally and integrates them if they occur within a given preselected time interval, but is not influenced in any way by pulses outside of the said time interval. A scaler is a square memory device, adding arithmetically every pulse received by it during any interval that it is actuated. However, a scaler cannot provide a continuous indication of the integrated total of pulses occurring after irradiation and prior to measurement. It will be seen that this number is exactly proportional to the elapsed time between irradiation and measurement, and comprises the actual pulses occupying the segment of tape at any instant between the recording and reproducing heads. This may be accomplished by a circuit which continuously adds numerically all pulses or cycles of the constant frequency tone as it is applied to the tape, and continuously subtracts from the integrated total all pulses passing the reproducing head. This may be done with either a digital integrating circuit or an analogue circuit by conventional means. One example of the latter is to employ two conventional rate meters with very long time constants and with outputs in opposition, one measuring the pulse rate at the recording head, the other at the reproducing head. If the respective time constants are long compared with the time required for the tape to move from recording head to reproducing head, then the required "square memory" integration is obtained.

An alternate method of employing the magnetic tape to derive the desired log corrections is identical with the above method insofar as the measurement of elapsed time is concerned. However, the effects of varying source strength and varying speed during irradiation are compensated in a different way. In this method, as in the previous method, the tape is driven at a rate proportional to the true speed of the subsurface tool, and pulses from a source monitor are recorded on the tape as it moves past the recording head. It will be seen that the number of pulses per unit length of tape is then proportional to the number of neutrons irradiating the corresponding section of the borehole. For a given source intensity, the number of neutrons emitted per unit of depth travelled in the borehole is inversely proportional to the speed of the tool. If the source intensity varies, the number of neutrons striking each unit of depth is proportionately varied. Thus, irrespective of tool speed or source intensity variations, if any, the number of pulses per unit length of tape is proportional to the irradiation experienced by each corresponding section of the borehole. A voltage proportional to this quantity is required for correction of the log. This can be derived, in a manner like that previously described, with a square memory device. In this case, however, it is normally desired that the integration be made over only a short length of tape corresponding to e.g. one foot of borehole travel of the instrument. It is, therefore, satisfactory to perform a discontinuous integration such as the following: arrange a circuit such that pulses from the reproducing head are integrated by accumulating on a condenser; a switch is arranged to be driven by the tape transporting mechanism, which is in turn driven in synchronism with depth of the logging tool in the borehole; this switch is actuated at selected intervals of tape length corresponding to e.g. 1 foot of movement of the subsurface instrument; during each successive interval the pulses are accumulated on the condenser during the interval; and then at the end of the interval, the resultant voltage is measured by e.g. a VTVM, whereupon the condenser is discharged and the cycle repeated. Obviously, this function can be somewhat more efficiently accomplished if two alternate condensers are employed, each being measured and discharged while the other is performing an integration. The voltage thus derived is then applied as a correction to the measured activation corresponding to the same interval in the borehole in order to derive the true or expected activation.

In the above discussion it may be assumed, for illustration, that the tape travels at the same velocity as the well tool, and, therefore, the recording and reproducing heads of a tape channel have the same spacing as the radiation source and radiation detector. It is apparent that the important factor is the time required for the tape to move the distance between the two heads, and, therefore, the spacing of these elements along the tape is governed by the speed ratio between the tape and the well tool. A one-to-one speed ratio is to be assumed only for purposes of description.

The above embodiment of the invention provides a continuous system in that the signals are recorded on a continuous basis, so that corrections are provided on a continuous basis. In a second embodiment of the invention, a discontinuous correction system is employed. In this system, there is provided a plurality of capacitors each having one terminal connected to ground, and each having another terminal connected to a distinct stationary contact of a rotary switch. The rotary switch is provided with three contact arms, which are ganged to be rotated by the sheave over which the well logging tool cable passes. The spacing between each of the arms of the rotary switch is equal to the spacing between the centers of the stationary contacts, and the length of each contact is related to the length of the area irradiated by the source and the length of the detector. Specifically, the contacts are of such a length that the arms of the switch engage a contact for an interval equal to the interval that an incremental area of the well borehole is irradiated and also measured. If now a signal proportional to the intensity of the source is applied to one of the arms, the capacitor receives a charge which is proportional both to the intensity of the source and the time of irradiation. Each capacitor is connected in parallel with a resistor and the time constant of the resistor-capacitor circuit is equal to the decay time of the induced activity so that the decay of the voltage across the capacitor during the interval between the application of a voltage to a capacitor and the subsequent measurement of this voltage is proportional to the decay of the induced activity. In consequence, the charge accumulated by the capacitor is proportional to the source intensity during the irradiation and proportional to the activation remaining in the formation relative to that initially induced by the irradiation.

The third arm of the switch is employed to discharge each of the capacitors after a measurement interval and before the next charging interval initiated when the arm to which the intensity signal is applied is again brought into engagement with a contact of a particular condenser.

In the above two embodiments of the present invention, it is assumed that the well tool is always travelling at the same velocity as the sheave over which the well tool cable passes. However, as a practical matter, the velocity of the sheave represents only the average velocity of the tool and, in fact, the velocity of the tool at any instant may be considerably different from the velocity of the sheave. Such a situation arises, particularly in deep holes, where in a well logging tool may encounter an obstruction in the well that either reduces the speed of the tool or temporarily stops its upward movement. Under such circumstances, the cable stretches due to its normal elasticity and, at the surface station, very little reduction in velocity is observed. In consequence, so far as the surface station equipment is concerned, the tool continues to move at a constant or slightly reduced velocity whereas, in fact, the tool may be stationary or moving quite slowly and the cable stretches to make up the difference between the velocity of the drum which is reeling up the cable and the velocity of the tool. When the tool is finally released from the obstruction due to the increased upward force exerted by the cable, the tool oscillates or "Yo-Yoes" on the end of the cable producing further inaccuracies in the record.

In accordance with a further feature of the present invention, inaccuracies, which result from the above phenomena, are eliminated by incorporating a device for determining the true velocity of the subsurface tool and employing this velocity to vary the velocity of the tape in one instance and the rotating arms of the switch in the other instance. This may be accomplished for example by employing an acceleration responsive instrument in the well tool which indicates variations in speed from that experienced by the sheave wheel. Specifically, the tape drive or rotating contacts of the switch may be driven from the sheave over which the well tool cable passes through a differential gear to which is applied, as a second input rotation, a rotation which is a function of the acceleration of the well tool. This latter shaft rotation may be developed by applying the signal from the downhole accelerometer to a motor speed and direction control that controls the speed and direction of rotation of a variable speed motor. This motor drives the second input shaft to the differential gear and the output shaft of the differential gear mechanism is now driven at a velocity which is a function of the velocity observed by the sheave and corrected as a function of acceleration observed by the accelerometer. By employing such apparatus, the instantaneous velocity of the tape or the instantaneous velocity of rotation of the movable contacts of the switch is proportional to the instantaneous velocity of the well tool and this further source of inaccuracy is removed from the measurement.

It is broadly another object of the present invention to provide a radioactivity well logging system in which inaccuracies due to variations in velocities of the well logging tool are eliminated.

It is yet another object of the present invention to provide a radioactivity well logging system in which variations in intensity of the source, irradiation interval of the incremental areas of the well, the variations in delay between irradiation and measurement are all minimized and, further, variations in all of these quantities resulting from accelerations and decelerations of the well tool are reduced.

Yet another object of the present invention is to provide a radioactivity well logging tool with an accelerometer and to compensate well logging information in accordance with both the average velocity and instantaneous acceleration of the well logging tool.

The above and still further objects, features and advantages of the present invention will become apparent upon consideration of the following detailed description of several embodiments thereof, especially when taken in conjunction with the accompanying drawings, wherein:

FIGURE 1 is an illustration of the well logging system to which the apparatus of the present invention may be applied;

FIGURE 2 is a partial mechanical and partial electrical block diagram of a first embodiment of the apparatus of the present invention;

Figure 3:
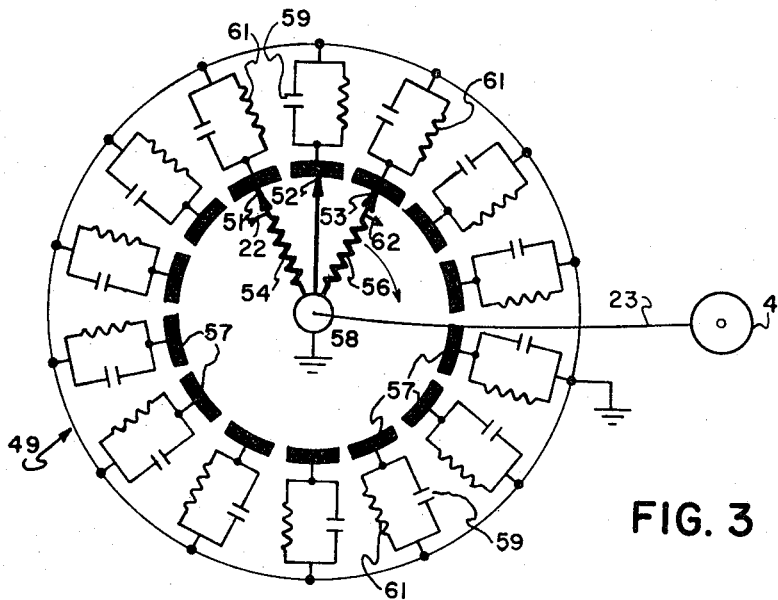
FIGURE 3 is a partial mechanical and partial electrical schematic circuit and block diagram of a second embodiment of the apparatus of the present invention.
Figure 4:
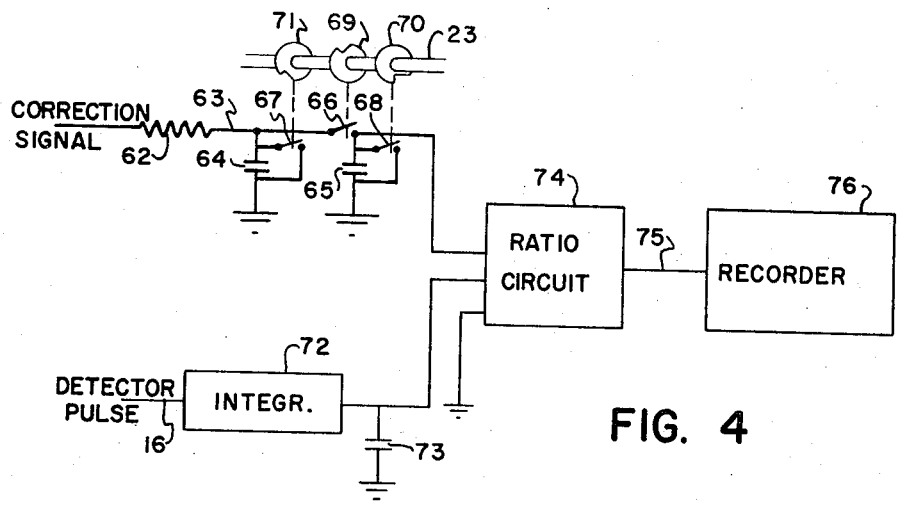

FIGURE 4 of the accompanying drawings is a block diagram of a measuring circuit which may be employed with the embodiment of the invention illustrated in FIGURE 3; and FIGURE 5 is a partial mechanical and partial electrical block diagram of a system for correcting the measurements produced by the apparatus of FIGURE 2 and 3 for well tool accelerations and decelerations.

Referring now specifically to FIGURE 1 of the accompanying drawings, a well tool 1 is suspended in a borehole 2 from a cable 3. The cable 3 passes over a sheave 4 at the surface station and is wound on a drum 6 driven by a source of power not illustrated. The well tool 1 is provided with a source of radiation 7 and a radiation detector 8. The source 7 is a source of high energy neutrons and may constitute a naturally radioactive source or a linear accelerator for directing high speed ions against a target which produces neutrons upon bombardment. The detector 8 may be a Geiger-Müller detector, scintillation counter or other detector of gamma radiation for producing a pulse in response to radioactive quantum. The source and detector are separated by a shield 9 which prevents neutrons from the source 7 from impinging directly upon the detector 8. The spacing between the source 7 and detector 8 may vary from tool to tool but, for purposes of explaining the operation of the present invention, this distance is taken to be approximately six feet. Further, the area irradiated by the source 7 and investigated by the detector 8 are, for purposes of explanation only, taken to be equal and to be approximately eight inches. The well tool 1 is provided with a further radiation detector 10 which may be of the pulse rate type which is employed to monitor the intensity of the source 7. As previously indicated, although the radiations produced by the source 7 are of an average intensity over a relatively long interval they fluctuate quite radically over short intervals. In order to eliminate the effects of such variations from the measurements obtained from the instruments of the present invention, the source is monitored by the detector 10 and the signal produced is employed in the circuits of FIGURES 2 through 5 to eliminate this source of error. The well tool 1 further includes an accelerometer 11 in those instances where it is anticipated that the well tool 1 will be subjected to acceleration and deceleration forces not reflected in the velocity of the cable 3 as determined by the sheave 4.

As previously indicated, the cable 3 at the surface station is passed over a sheave 4 and is wound on a drum 6. The well cable 3 includes electrical leads 12 connected in the well tool 1 to the detector 8 and at the surface station to slip rings 13 on the drum 6. A set of brushes 14 are adapted to cooperate with the slip rings 13 to supply electric signals indicative of the pulse counts produced by the detector 8 on a pair of leads 16. The leads 16 are applied to a compensating and recording circuit 17 which may be either of the types illustrated in FIGURE 2 and FIGURES 3 and 4. The cable 3 is provided with a further pair of leads 18 which are connected in the well tool to the radiation detector 10 and are connected at the drum 6 to slip rings 19. The slip rings 19 are contacted by brushes 21 so as to develop the signals from the source 10 on a pair of leads 22. The leads 22 also supply signals to the compensating and recording circuit, 17.

In order to provide for proper compensation of the signals produced by the radiation detector 8, the instantaneous velocity of the well tool must be measured and in conventional manner the information relating to the velocity of the tool is applied from the sheave 4 to the compensating and recording circuit 17 via mechanical connection 23.

In accordance with one embodiment of the present invention, and reference is now made to FIGURE 2, of the accompanying drawings, a take-up reel 24 of a magnetic tape unit is driven by the sheave 4 via the mechanical connection or shaft 23. A magnetic tape 26 is employed on which three channels of information may be recorded. One of these channels is illustrated as the middle channel in FIGURE 2 of the accompanying drawings, and has prerecorded therein a constant frequency tone generally illustrated by the sine wave 27 in FIGURE 2. A magnetic reproducing head 28 is provided for this channel and reproduces the sine wave on a lead 29. The lead 29 is connected to the input circuit of an integrator 31 which produces a voltage on an output lead 32 proportional to the number of cycles of the sine wave presented thereto during a predetermined interval of time. This interval is related to the spacing between the source 7 and detector 8 of the well tool and the nominal or average desired velocity of the cable 3 as will be explained in greater detail subsequently.

A second channel of the tape 26 is provided with a recording head 33 and a reproducing head 34. The recording head 33 has a constant frequency tone supplied thereto from a fixed frequency oscillator 36 and since the speed of tape is controlled by the speed of the sheave 4, the signal recorded by the head 33 is frequency modulated in accordance with variations in the velocity of the sheave 4. Therefore, the frequency recorded in the second channel of the tape is a function of the irradiation interval of some region of the well wall. The radiation interval of any region of the well wall is of course a function of the velocity of the tool at the time of irradiation. Since the velocity of the tool is reflected in the velocity of the tape 26, the frequency of the signal applied to the tape by the recording head 33 is a function of the interval of irradiation of some region of the well. The pick-up head 34 is spaced from the recording head 33 by such a distance that the signal recorded by the head 33 which is indicative of the radiation interval of a given area is presented to the head 34 at the same time that this given area is presented to the detector 8. The velocity of the tape 26 at this instant is proportional to the velocity of the tool 1 as reflected in the sheave 4 and therefore the frequency of the signal appearing on an output lead 37 from the head 34 is also proportional to the time of measurement of the given region by the detector 8. In consequence, the frequency of the signal appearing on the lead 37 is a function of both the time of irradiation of this given area and the time of measurement of this same area by the detector 8. Further, this signal appears on the lead 37 at the same time the signals from detector 8 are developed on the leads 16. The signals appearing on the lead 37 are applied to a frequency discriminator 38 and a D.C. signal is developed on its output lead 39 proportional to the frequency of the signal on the lead 37.

The third channel of the tape 26 is provided with a recording head 41 and a reproducing head 42. The signals indicative of the intensity of the source 7 as measured by the detector 10 are applied to the recording head 41 via the leads 22. The recording heads 33 and 41 are aligned transversely relative to the direction of movement of the tape 26 so that the signal recorded by the head 41 is indicative of the intensity of the source 7 at the time the frequency modulated signal is produced by the head 33 indicative of the interval of irradiation of the region of the well being subjected to rays from the source 7. The reproducing head 42 is aligned with reproducing heads 28 and 34 so that the intensity signal recorded by the head 41 is presented to the reproducing head 42 in synchronism with the other signals representing information relating to the same specific incremental area of the well wall. Since the signal recorded by the head 41 is an amplitude variable signal and the velocity of the tape 26 varies with variations of the speed of rotation of the sheave 4, the reproducing head 42 must be insensitive to velocity of the tape. A flux gate valve type of reproducing head may be employed for this purpose.

Returning now momentarily to the integration circuit 31, the time constant of this circuit should be equal to the average time required for a given cycle of the wave 27 to proceed from the region of the recording heads 33 and 41 to the pick-up head 28 since this time interval is equal to the average interval required for the tool to move a distance equal to the spacing between the source 7 and the detector 8. The signals appearing on the leads 32, 39, and 43 are applied to a summation circuit 44 employing resistors properly weighted so that a signal is developed on a lead 46 having the proper value for producing an accurate correction of the signals produced by the detector 8. The signals appearing on the lead 46 are amplified by an amplifier 47 and employed in this embodiment of the invention to control the counting rate sensitivity of a counting rate meter 48. The pulses produced by the detector 8 are applied to the counting rate meter via the cable 2 and the leads 16. The correction signals appearing on the lead 46 are synchronized in time with the pulse rate signals to which these error signals relate. This, of course, is due to the spacing between the recording and pick-up heads of the tape 26 commensurate with the velocity of the tape. In the system illustrated, the sheave 4 directly drives the take-up reel 24 of the tape 26. If it is necessary in order to permit a more suitable spacing between the recording and pick-up head, reduction or step-up gears may be employed in the mechanical linkage 23, but in all instances the interval required for an incremental area on the tape 26 to proceed from recording to a pick-up head must be equal to the interval required for the tool to move a distance equal to the spacing between the radiation source 7 and detector 8.

Summarizing the operation of the above system, the time constant of the integrator circuit 31 is equal to the time for an incremental area on the tape 26 to proceed from the region of the recording heads to the region of the pick-up 28 and therefore a signal appearing on the lead is proportional to the interval between irradiation and measurement of a given region of the well wall. This circuit then introduces a correction signal to account for the decay of the induced activity from the instant of irradiation to the instant of measurement. The signal appearing on the lead 37 is a function of both irradiation and detection intervals and the signal appearing on the lead 43 is a function of the intensity of the source at the time of irradiation of an area whose radioactivity is at that instant being measured by the detector 8. In consequence, effects resulting from the four undesired variables in a radioactivity well logging system are compensated or minimized by the system of FIGURE 2.

The system of FIGURE 2 is relatively expensive requiring a three channel tape system but has the advantage of being a continuous system. A less expensive but discontinuous system of providing the necessary corrections in a radioactivity well logging system is illustrated in FIGURE 3 of the accompanying drawings. In FIGURE 3, there is illustrated a rotary switch 49 having three rotating contacts or arms 51, 52, and 53. The contact 52 is directly connected to a source of reference potential, preferably ground, while the contacts 51 and 53 are connected to ground through high impedances 54 and 56 respectively. The movable contacts 51 and 52 and 53 are adapted to engage a plurality of stationary contacts 57, arranged in a circle in FIGURE 2 for ease of description, so that upon movement of the arm of the contacts 51, 52 and 53 about a common center 58, the arms sequentially and successively engage the contacts 57. Each contact 57 is connected to ground potential through a distinct parallel combination of a capacitor 59 and a registor 61. As previously indicated, the spacing between the source 7 and detector 8 is assumed to be six feet and therefore, if twelve segments 57 with associated condensers and resistors are provided, then every six inches each of the rotating contacts breaks connection with one of the arcuate segments 57 and engages the next succeeding arcuate segment. The detector 8 is approximately eight inches long and the source irradiates a comparable region so that although the system illustrated in FIGURE 3 is discontinuous in nature, the six inch steps provide a substantially continuous measurement since the measured regions as determined by the contacts 57 overlap. Although only twelve condensers are required to provide the six inch steps, a minimum of two additional stationary contacts 57 are desirable to permit sampling of the stored charge on a capacitor in the system and subsequent discharge of the capacitor prior to recharging with a new measurement value.

If a system more closely approximating a continuous system is desired, twenty-six capacitors may be employed with a corresponding twenty-six segments 57. The system again requires two additional capacitors to provide measurement and discharge intervals and therefore only twenty-four capacitors are disposed between the charging and measuring contacts. Such a system would reduce the length of region represented by the charges on the capacitors to three inches. This length is less than half of the length of the region measured by the detector 8 and provides for an accurate monitoring of conductions to be corrected.

Referring again specifically to FIGURE 3, the source intensity signal generated by the detector 10 appears on the lead 22 connected to the movable contact 51. In the illustration, the contact 51 engages one of the contacts 57 and therefore charges its associated capacitor 59. The capacitor charges towards a voltage indicative of the intensity of the signal. The charging continues for a length of time proportional to the velocity of the tool since the arm 51 is rotated by the sheave 4 at a speed proportional to the velocity of the tool. In consequence, the charge finally accumulated by the resistor 59 is proportional to both the intensity of the irradiation source and the time of irradiation. The latter statement is true only so long as the capacitor is charging over a linear portion of its curve. This, of course, can be accomplished by initial selection of capacity size and charging rate. The time constant of the parallel circuit 59-61 is related to the half life of the activity being measured by the detector 8. Further, the time between the charging of the capacitor 59 and subsequent measurement of the retained charge on 59 is equal to the time interval between irradiation and measurement of an area on a region of the well wall and therefore the charge retained by the capacitor 59 at the end of this interval is now proportional to the intensity of the signal of the irradiation source at the time of irradiation of an area, the interval of irradiation of an area and the interval between irradiation and measurement. When the contact 57 under consideration is engaged by the arm 53, a measurement of the charge on the capacitor 59 takes place. More specifically, the movable contact 53 is connected via a lead 62 and through a high impedance resistor 63 to a capacitor 64 (see FIG. 4). The circuit produces a voltage across the capacitor 64 that is proportional to both the charge on the capacitor 59 and the interval during which the circuit is connected to this capaictor. Therefore, the voltage appearing across the capacitor 64 is related to the measurement interval of a given incremental area of the well wall as determined by the interval during which the contact 53 engages the contact 57 as well as the voltage remaining on capacitor 59 which is related to the intensity of the source at the time of irradiation, the irradiation interval and the interval between irradiation and measurement.

The voltage across the capacitor 64 is correct only at the end of movement of the contact 53 over a contact 57. Therefore in order to presume this final voltage over an interval required to again charge the capacitor 64 to a correct value, there is provided a further capacitor 65. The capacitor 64 is connected to the capacitor 65 through a normally open switch 66. The capacitors 64 and 65 are shunted by normally open switches 67 and 68 respectively. The switches 66, 67 and 68 are operated by timing cams 69, 70 and 71 respectively, carried by the shaft 23 or a shaft driven by the shaft 23 through a suitable spacing arrangement.

In operation, the switch 68 is closed as the contact 53 approaches the end of a contact 57, to discharge capacitor 65. The switch 66 is now closed and the charge on capacitor 64 is transferred to capacitor 66. The switch 67 is now closed, and the capacitor 64 is discharged. The switches 66, 67 and 68 are closed for brief periods only so that by the time arm 53 engages the next succeeding contact 57 the switches are again open.

The voltage now appearing across the capacitor 65 corresponds to the voltage developed on the lead 46 of FIGURE 2; and represents the correction signal which may be applied to a count rate meter such as the meter 48 of FIGURE 2. However, the system as illustrated in FIGURE 4 provides for a different type of measuring circuit for purposes of example only since many types of measuring circuits may be employed. The detector pulses appearing on the leads 16 are applied to an integrator 72 which develops a voltage across a capacitor 73 proportional to the count rate appearing on lead 16. A ratio taking circuit 74 is connected to the high voltage plate of the capacitors 65 and 73 and therefore produces a voltage on its output lead 75 proportional to the ratio between capacitor voltages. This ratio is a value that contains the correction voltage relating to the various inaccuracies of the conventional radioactivity well logging system as enumerated above. The voltage appearing on the lead 75 may be applied to a recorder 76 to produce a log of the true activity of the well bore. The recorder element such as the graph paper or chart of the recorder 71 may be driven from the sheave 4.

In operation of the circuit, the arm 52 discharges each of the capacitors 59 immediately after it has been interrogated by the arm 53 so as to prepare it for recharging by the arm 51. In order to provide the necessary reading and discharge intervals, two additional capacitors and resistor circuits are provided or otherwise the reading, charging and discharging intervals would overlap and render the device inoperative.

As indicated previously, the accuracy of the systems illustrated in FIGURES 2, 3 and 4 depend upon the assumption that the sheave 4 is moving at the same velocity as the well tool 1. In some systems, particularly in shallow wells, this assumption is substantially correct and may be tolerated. However, in deep wells the tool 1 may encounter an obstruction in the well and either have its velocity reduced or be temporarily brought to a complete stop. During such intervals, the long length of cable 3 stretches and the velocity of the sheave is either unchanged or diminished only relatively slightly compared with the change in velocity of the tool 1. If such is the case, then the systems illustrated in FIGURES 2, 3 and 4 do not provide an accurate correction of the radioactivity well logging signal since the interval required in FIGURE 2 for the tape to move from the recording to the pick-up heads is not related to the time required for the tool to move the distance equal to the distance between the source 7 and the detector 8. Further, the frequency modulation effect of the variation of velocity of the tape 26 in the channel having heads 33 and 34 is not related to the velocity of the tool.

In accordance with a further feature of the invention, the shaft 23 and therefore the tape 26 of FIGURE 2 or the movable contacts 51, 52 and 53 of FIGURE 3 is driven in accordance with both the velocity of the tool as reflected in the sheave 4 and the acceleration of the tool 1 as measured by the accelerometer 11. Referring now to FIGURE 5, the accelerometer signals are developed on a lead 72 and applied to a motor speed and direction control circuit 78. The circuit 78 controls the speed and direction of rotation of an electric motor 79, which drives an output shaft 80. The output shaft 80 constitutes one input shaft to a differential gear mechanism 81 having a second input shaft 82 driven by the sheave 4. The differential gear 81 has an output shaft 23, which drives the take up reel 24 of the tape unit of FIGURE 2. Alternatively, the output shaft 23 of FIGURE 5 may drive the rotatable contacts 51, 52, 53 of the rotary switch 49 of the apparatus of FIGURE 3. In either case, the speed of the driven member is now a function of both the average velocity of the tool 1 as reflected in sheave 4 and the instantaneous acceleration of the tool as measured by the accelerometer 11. Consequently, when the tool 1 encounters an obstruction in the well which changes its velocity with respect to the sheave 4, thereby resulting in stretching of the cable 3, such changes in velocity are reflected in the compensating and recording circuits 17, thereby eliminating another possible source of inaccuracy in the system.

The above discussion assumes that there are no steady state changes in velocity of the tool, and, therefore, assumes that the tool is either travelling at the velocity of the sheave 4 or is accelerating of decelerating with respect thereto. As a practical matter, the tool 1 may on occasion have a steady state velocity different from the velocity of the sheave 4. Therefore, in systems where extreme accuracy is desired, the tape 26 or arms 51, 52 and 53 of the rotary switch 49 may be driven from a motor to which is applied the signals from the accelerometer and the first integral of these signals. In such a system then, the apparatus is operated at all times at the velocity of the tool 1 and no assumptions need be made.

It is apparent that if the well tool oscillates in the cable 3, certain areas of the well wall will receive additional doses of radiation. The tape system of FIGURE 2 cannot cope with such a situation but the system of FIGURES 3 and 4 can. If the arms 51, 52 and 53 rotate in the wrong direction, then the capacitor whose contact is engaged by arm 51 is subjected to a second charging interval which corrects for this fact. On the measuring end, the signal developed across the capacitor 64 from a given capacitor 59 is increased, since the measuring interval is increased. The decay interval is also extended as it should. Therefore, this latter system is adapted for use with an oscillating tool and provides a highly accurate system of radioactivity well logging.

While I have described and illustrated several embodiments of my invention, it will be clear that variations of the details of construction which are specifically illustrated and described may be resorted to without departing from the true spirit and scope of the invention as defined in the appended claims.

I claim:
1. A well logging instrument comprising:
   a well logging tool adapted to be withdrawan from a well during logging operations;
   means disposed on said tool for irradiating the strata traversed by said tool;
   a radiation detector responsive to radiation from said strata;
   means for detecting variations in velocity of said tool while being withdrawn from said well; and
   means for directly varying the irradiation to which said strata are subjected as a function of the rate of change of velocity of said tool thereby producing uniform irradiation of the strata.

2. A radioactivity well logging system comprising:
   a well tool;
   means for moving said well tool through a well bore;
   a radiation source disposed in said well tool for irradiating a predetermined region of the wall of said well bore relative to said tool;
   a radiation detector disposed in said well tool for measuring irradiations emanating from said wall of said well bore;
   means for producing a first voltage indicative of the radiation measured by said detector;
   means for producing a second voltage proportional to the interval of irradiation of said predetermined region of said well; and
   means for modifying said first voltage as a function of said second voltage.

3. A radioactivity well logging system comprising:
   a well tool;
   means for moving said well tool through a well bore;
   a radiation source disposed in said well tool for irradiating a predetermined region of the wall of said well bore relative to said tool;
   a radiation detector disposed in said well tool for measuring irradiations emanating from said wall of said well bore;
   means for producing a first voltage indicative of the radiations from said predetermined region of said well measured by said detector;
   means for producing a second voltage proportional to the elapsed time between irradiation and measurement of the radioactivity of said predetermined region of said wall of said well bore; and
   means for modifying said first voltage as a function of said second voltage.

4. A radioactivity well logging system comprising:
   a well tool;
   means for moving said well tool through a well bore;
   a radiation source disposed in said well tool for irradiating a predetermined region of the wall of said well bore relative to said tool;
   a radiation detector disposed in said well tool for measuring irradiations emanating from said wall of said well bore;
   means for producing a first voltage indicative of the radiations from said predetermined region of said wall measured by said detector;
   means for producing a second voltage proportional to the measurement interval of measurement of said predetermined region of said wall; and
   means for modifying said first voltage as a function of said second voltage.

5. A radioactivity well logging system comprising:
   a well tool;
   means for moving said well tool through a well bore;
   a radiation source disposed in said well tool for irradiating a predetermined region of the wall of said well bore relative to said tool;
   a radiation detector disposed in said well tool for measuring irradiations emanating from said wall of said well bore;
   means for producing a first voltage indicative of the radiations from said predetermined region of said wall measured by said detector;
   means for producing a second voltage proportional to the interval of irradiation and the interval of measurement of said predetermined region of said wall; and
   means for modifying said first voltage as a function of said second voltage.

6. A radioactivity well logging system comprising:
   a well tool;
   means for moving said well tool through a well bore;
   a radiation source disposed in said well tool for irradiating a predetermined region of the wall of said well bore relative to said tool;

a radiation detector disposed in said well tool for measuring irradiations emanating from said wall of said well bore;

means for producing a first voltage indicative of the radiations from said predetermined region of said wall measured by said detector;

means for producing a second voltage proportional to the interval of irradiation and the interval of measurement of said predetermined region of said wall, and to the elapsed time between irradiation and measurement of said predetermined region; and means for modifying said first voltage as a function of said second voltage.

7. A radioactivity well logging system comprising:

a well tool;

means for moving said well tool through a well bore;

a radiation source disposed in said well tool for irradiating a predetermined region of the wall of said well bore relative to said tool;

a radiation detector disposed in said well tool for measuring irradiations emanating from said wall of said well bore;

means for producing a first voltage indicative of the radiations from said predetermined region of said wall measured by said detector;

means for producing a second voltage proportional to the interval of irradiation of said predetermined region of said well, and to the intensity of said radiation source at the time of irradiation of said predetermined region of said wall of said well bore; and means for modifying said first voltage as a function of said second voltage.

8. A radioactivity well logging system comprising:

a well tool;

means for moving said well tool through a well bore;

a radiation source disposed in said well tool for irradiating a predetermined region of the wall of said well bore relative to said tool;

a radiation detector disposed in said well tool for measuring irradiations emanating from said wall of said well bore;

means for producing a first voltage indicative of the radiations from said predetermined region of said wall measured by said detector;

means for producing a second voltage proportional to the elapsed time between irradiation of and measurement of the radioactivity of said predetermined region of said wall of said well bore and to the intensity of said radiation source at the time of irradiation of said given region of said wall of said well bore; and means for modifying said first voltage as a function of said second voltage.

9. A radioactivity well logging system comprising:

a well tool;

means for moving said well tool through a well bore;

a radiation source disposed in said well tool for irradiating a predetermined region of the wall of said well bore relative to said tool;

a radiation detector disposed in said well tool for measuring irradiations emanating from said wall of said well bore;

means for producing a first voltage indicative of the radiations from said predetermined region of said wall measured by said detector;

means for producing a second voltage proportional to the interval of irradiation of and the interval of measurement of said region of said well, and to the intensity of said radiation source at the time of irradiation of said predetermined region of said wall of said well bore; and means for modifying said first voltage as a function of said second voltage.

10. A radioactivity well logging system comprising:

a well tool;

means for moving said well tool through a well bore;

a radiation source disposed in said well tool for irradiating a predetermined region of the wall of said well bore relative to said tool;

a radiation detector disposed in said well tool for measuring irradiations emanating from said wall of said well bore;

means for producing a first voltage indicative of the radiations from said given region of said wall measured by said detector;

means for producing a second voltage proportional to the interval of irradiation of and the interval of measurement of said predetermined region of said wall, and to the elapsed time between irradiation and measurement of said predetermined region;

means for producing a third voltage proportional to the intensity of said radiation source at the time of irradiation of said given region of said wall of said well bore; and means for modifying said first voltage as a function of said second voltage.

11. A radioactivity well logging system comprising:

a well tool;

means for moving said well tool through a well bore;

a radiation source disposed in said well tool for irradiating a predetermined region of the wall of said well bore relative to said tool;

a radiation detector disposed in said well tool for measuring irradiation emanating from said wall of said well bore;

means for producing a first voltage indicative of the radiations from said predetermined region of said wall measured by said detector;

sensing means for producing a signal approximately proportional to the velocity of said well tool;

means including said sensing means for producing a second voltage proportional to the time of irradiation of and the time of measurement of irradiation of said predetermined area and the elapsed time between irradiation and measurement of said predetermined area; and means for modifying said first voltage as a function of said second voltage.

12. A radioactivity well logging system comprising:

a well tool;

means for moving said well tool through a well bore;

a radiation source disposed in said well tool for irradiating a predetermined region of the well of said well bore relative to said tool;

a radiation detector disposed in said well tool for measuring irradiations emanating from said wall of said well bore;

means for producing a first voltage indicative of the radiations from said predetermined region of said wall measured by said detector;

a record element;

means for driving said record element at a velocity proportional to the velocity of said well tool;

recording means and reproducing means adapted to record signals on and reproduce recorded signals from said record element, respectively, said recording and reproducing means being spaced apart by such a distance that a region on said record element traverses the distance therebetween in the same time required for said well tool to move a distance equal to the distance between said source and said detector;

means for supplying a constant frequency signal to said recording means;

means for producing a second voltage that is a function of the frequency of said signal as reproduced by said reproducing means; and means for modifying said first voltage as a function of said second voltage.

13. The combination according to claim 12 wherein said record means has a constant frequency signal recorded thereon, and further comprising:
  a second reproducing means for reproducing said constant frequency signal;
  integrator means for producing a third voltage proportional to the number of cycles of said constant frequency signal presented to said second reproducing means during the interval required for said well tool to move the distance between said source and said detector; and
  means for modifying said first voltage as a function of said second and said third voltages.

14. The combination according to claim 13 further comprising:
  a further recording means and a further reproducing means for recording signals on and reproducing signals, respectively, from a third channel of said record element, said further recording and reproducing means being spaced apart by approximately the same distance as said first recording and reproducing means;
  means for supplying to said recording means a signal indicative of the instantaneous intensity of said source, said further reproducing means developing an output voltage proportional to the signal recorded by said further recording means; and
  means for further modifying said first voltage as a function of said output voltage.

15. A radioactivity well logging system comprising:
  a well tool;
  means for moving said well tool through a well bore;
  a radiation source disposed in said well tool for irradiating a predetermined region of the wall of said well bore relative to said tool;
  a radiation detector disposed in said well tool for measuring irradiations emanating from said wall of said well bore;
  means for producing a first voltage indicative of the radiations from said predetermined regions of said wall;
  an acceleration responsive means in said well tool for producing a first signal indicative of the changes in velocity of said tool;
  a cable for suspending said tool in said well bore;
  means for producing a second signal indicative of the velocity of said cable at a surface station;
  a record element;
  means for moving said record element at a velocity which is a function of said first and said second signals;
  recording means and reproducing means adapted to record signals on and reproduce recorded signals, respectively, from said record element, said recording and reproducing means being spaced apart by such a distance that a region on said record element traverses the distance therebetween in the same time required for said well tool to move a distance equal to the distance between said source and said detector;
  means for supplying a constant frequency signal to said recording means;
  means for producing a second voltage that is a function of the frequency of the signal reproduced by said reproducing means; and
  means for modifying said first voltage as a function of said second voltage.

16. The combination according to claim 15 wherein said record means has a constant frequency signal recorded thereon, and further comprising:
  a second reproducing means for reproducing said constant frequency signal;
  integrator means for producing a second voltage proportional to the number of cycles of said constant frequency signal presented to said second reproducing means during the interval required for said well tool to move the distance between said source and said detector; and
  means for modifying said first voltage as a function of said second voltage.

17. A radioactivity well logging system comprising:
  a well tool;
  means for moving said well tool through a well bore;
  a radiation source disposed in said well tool for irradiating a predetermined region of the wall of said well bore relative to said tool;
  a radiation detector disposed in said well tool for measuring irradiations emanating from said wall of said well bore;
  means for producing a first voltage indicative of the radiations from said predetermined region of said wall measured by said detector;
  a switch having first, second and third movable contacts and a plurality of stationary contacts, the number of stationary contacts being equal to at least two more than the quotient of the distance between said source and said detector divided by the length of said predetermined region;
  a different resistor and capacitor connected in parallel between each of said stationary contacts and a reference potential, the time constant of each of said parallel connector resistors and capacitors being related to the decay rate of the radiation to be measured, said movable contacts engaging adjacent stationary contacts, said first contact of said three movable contacts being connected to said reference potential and being the middle of said three movable contacts;
  means for applying a predetermined signal to said second movable contact;
  drive means for moving said movable contacts so as to sequentially and successively engage said stationary contacts, said movable contacts being moved at a rate proportional to the velocity of said well tool;
  means for deriving a control voltage from said third movable contact proportional to the voltage across the capacitor associated with the stationary contact engaged by said third movable contact and proportional to the time of engagement between said third contact and said stationary contact; and
  means for modifying said first voltage as a function of said control voltage.

18. The combination according to claim 17 wherein said drive means comprises:
  an acceleration responsive means for developing a signal proportional to accelerations of said well tool;
  a cable for suspending said well tool in said well bore;
  means for producing a signal proportional to the velocity of said cable at a surface station; and
  means for moving said movable contacts at a rate proportional to both of said signals.

References Cited

UNITED STATES PATENTS

| | | | |
|---|---|---|---|
| 2,827,572 | 3/1958 | Blanchard | 250—83.6 |
| 3,061,728 | 10/1962 | Arnold | 250—84.5 |
| 3,141,126 | 7/1964 | Bennett et al. | 324—1 |

ARCHIE R. BORCHELT, *Primary Examiner.*